Patented July 9, 1940

2,206,878

UNITED STATES PATENT OFFICE 2,206,878

PROCESS FOR PREPARING CYCLOPROPANE

Walter G. Christiansen, Glen Ridge, N. J., assignor to E. R. Squibb & Sons, New York, N. Y., a corporation of New York No Drawing. Application June 23, 1939,
Serial No. 280,815

7 Claims. (Cl. 260—666)

This invention relates to the preparation of cyclopropane.

Cyclopropane has heretofore been prepared by the treatment of trimethylene dihalides with metal reduction agents in essentially-alcoholic reaction media, e. g., by the reduction of trimethylene dibromide with zinc in about 86% alcohol (Lott and Christiansen, Jour. A. Ph. A., 19 (1930) 341).

In the commercial production of cyclopropane, it is obviously essential for economic reasons that the alcohol used in the reaction medium be recovered; such recovery, however, is time-consuming and requires additional apparatus, and hence is relatively expensive.

It is the object of this invention to provide an improved process of preparing cyclopropane by the reduction of trimethylene dihalides which dispenses with the necessity of processing the spent reaction medium for solvent recovery.

Owing to the well-known substantial insolubility of the trimethylene dihalides in water, it has hitherto been assumed that the reaction medium must be essentially an organic solvent for trimethylene dihalides, e. g. ethanol. It has been found, however, that trimethylene dihalides may be converted to cyclopropane by treatment with a metal reduction agent in an essentially-aqueous reaction medium (i. e. a medium constituted in major proportion, or entirely, of water) containing a small proportion of an emulsifying agent.

The invention is applicable generally to the production of cyclopropane by the reduction of trimethylene dihalides, notably the dibromide and chlorobromide; the utilizable metal reduction agents include, inter alia, zinc and magnesium; and the essentially-aqueous reaction medium may include a minor proportion of a lower aliphatic alcohol, e. g. methyl, ethyl or isopropyl alcohol. Preferably, the reaction is effected in the presence of a small proportion of an alkali, notably $Mg(OH)_2$ (as described and claimed in the copending application of J. M. Ort, Serial No. 280,847, filed simultaneously herewith), and also a catalyst consisting of a dissolved salt of a metal capable of being displaced by the metal reduction agent (as described and claimed in the copending application of W. A. Lott, Serial No. 139,987, filed April 30, 1937).

The utilizable emulsifying agents include, inter alia: Acimul (a commercial mixture of glycerol stearates); compounds of the general formula

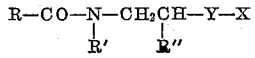

wherein R—CO— represents an acyl radical of a higher fatty acid, R' and R" represent, each, hydrogen or a lower alkyl group, Y represents an —$SO_3$— or —O—$SO_3$— group, and X represents hydrogen, an alkali metal or ammonium (e. g. Igepon or Intramine); and sodium lauryl sulfate (Duponol). When the reaction medium contains an alkali, particularly $Mg(OH)_2$, the emulsifying agent selected must be capable of functioning in its presence; Acimul, Igeon, and Duponol, for example, are effective in the presence of $Mg(OH)_2$.

The following examples are illustrative of the invention:

Example 1

A mixture of the following:

| | |
|---|---:|
| Distilled water_____cubic centimeters__ | 165 |
| KBr_____gram__ | 1 |
| Acimul_____grams__ | 6.24 |
| 5% $FeCl_3$ solution____cubic centimeters__ | 3 |
| Zinc dust_____grams__ | 51.8 |
| Dry $Mg(OH)_2$_____grams__ | 20.0 | is heated on the steam bath and 62.4 g. trimethylene chlorobromide is added slowly so as to produce the desired rate of evolution of cyclopropane; an approximately 75% yield is obtained.

Example 2

A mixture of the following:

| | |
|---|---:|
| Distilled water_____cubic centimeters__ | 390 |
| 5% $FeCl_3$ solution_____do____ | 8 |
| KBr_____grams__ | 3 |
| Acimul_____grams__ | 5 |
| 95% ethanol_____cubic centimeters__ | 50 |
| Zinc dust_____grams__ | 65 |
| 5% $CuSO_4$ solution_____cubic centimeters__ | 8 |
| Dry $Mg(OH)_2$_____grams__ | 70 | is heated on the steam bath and 125 g. trimethylene chlorobromide is added slowly so as to produce the desired rate of evolution of cyclopropane; a 90% yield of cyclopropane is obtained.

The invention may be variously otherwise embodied, within the scope of the appended claims.

I claim:

1. The process of preparing cyclopropane which comprises reacting a trimethylene dihalide with a metal reduction agent in an essentially-aqueous reaction medium containing an emulsifying agent.

2. The process of preparing cyclopropane which comprises reacting trimethylene chlorobromide with a metal reduction agent in an essentially-aqueous reaction medium containing an emulsifying agent.

3. The process of preparing cyclopropane which comprises reacting a trimethylene dihalide with a metal reduction agent in an essentially-aqueous reaction medium containing an emulsifying agent and a small proportion of an alkali.

4. The process of preparing cyclopropane which comprises reacting a trimethylene dihalide with a metal reduction agent in an essentially-aqueous reaction medium containing an emulsifying agent and a small proportion of $Mg(OH)_2$.

5. The process of preparing cyclopropane which comprises reacting a trimethylene dihalide with a metal reduction agent in an essentially-aqueous reaction medium containing an emulsifying agent and a dissolved salt of a metal capable of being displaced by the metal reduction agent.

6. The process of preparing cyclopropane which comprises reacting a trimethylene dihalide with zinc in an essentially aqueous reaction medium containing an emulsifying agent.

7. The process of preparing cyclopropane which comprises reacting trimethylene chlorobromide with zinc in an essentially aqueous reaction medium containing an emulsifying agent, a dissolved salt of a metal capable of being displaced by zinc, and a small proportion of an alkali.

WALTER G. CHRISTIANSEN.